UNITED STATES PATENT OFFICE.

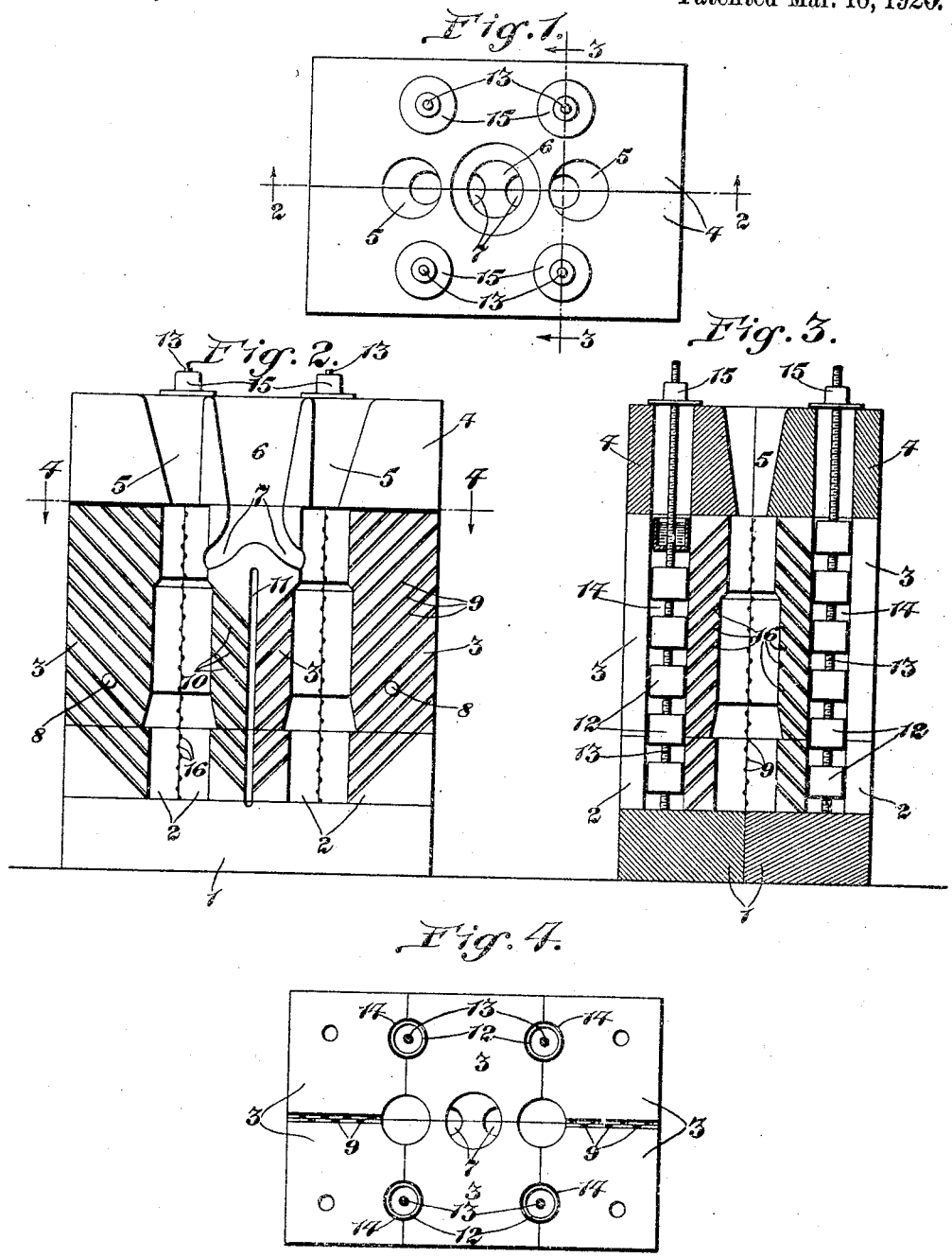

FREDERICK HACHMANN, OF ST. LOUIS, MISSOURI, ASSIGNOR, BY MESNE ASSIGNMENTS, TO NATIONAL METAL DIE MOLD COMPANY, OF ST. LOUIS, MISSOURI, A CORPORATION OF MISSOURI.

CASTING-MOLD.

1,334,029.      Specification of Letters Patent.      Patented Mar. 16, 1920.

Application filed July 5, 1918. Serial No. 243,280.

*To all whom it may concern:*

Be it known that I, FREDERICK HACHMANN, a citizen of the United States, residing at the city of St. Louis and State of Missouri, have invented a new and useful Casting-Mold, of which the following is a specification.

This invention relates to improvements in casting molds.

An object of the invention is to provide a casting mold having a mold cavity and provided with means for supplying a volatile carbonaceous matter to the walls of the mold cavity in order to prevent adhesion of the material cast.

Another object of the invention is to provide a casting mold having a mold cavity, and passages for delivering to the walls of the mold cavity a volatile carbonaceous matter in order to prevent adhesion of the material being cast, and also having venting passages to insure escape of the gases from the mold cavity during the casting operation.

A further object is to provide a casting mold having oil containers for containing a quantity of oil which is converted into a volatile carbonaceous matter by the heat of the mold, and passages for conducting the volatile carbonaceous matter to the walls of the mold cavity in order to prevent adhesion of the material being cast.

Figure 1 is a plan view of a mold embodying my invention.

Fig. 2 is an elevation showing the inner surfaces of the side members of the mold and also the mold cavities and the venting passages, viewed from the line 2—2 of Fig. 1.

Fig. 3 is a sectional view on the line 3—3 of Fig. 1.

Fig. 4 is a view of the lower portion of the mold, the portion being removed above the line 4—4 of Fig. 2.

My improved mold is composed of a number of adjacently disposed sections having matching recesses which, when the sections are properly placed, form a mold cavity. As shown there are a pair of members 1 forming the bottom of the mold; a plurality of members 2 supported by the bottom and having matching recesses to form a part of the mold cavity; a plurality of members 3 supported by the members 2 and having matching recesses to form a part of the mold cavity; and a top comprising a pair of members 4 supported by the members 3 having matching recesses 5 forming the risers for the mold, and having matching recesses 6 forming a receptacle for the material being poured into the mold. From the receptacle 6 the material passes into the mold through gates 7.

The several members or sections forming the mold may be held in proper relative positions by pins 8 on certain sections engaging in appropriate holes in other sections; and obviously the entire mold may be combined or bound together by an appropriate frame if desired.

From each mold cavity numerous inclined venting passages 9 are formed, the same extending upwardly and being arranged to insure the escape of the gas from the mold cavities during the casting operation. Also, when a number of mold cavities are provided in the same mold a number of venting passages 10 may be provided from each cavity, the same opening into an outlet passage 11 by which the gases are discharged from the mold.

My present invention comprises means for supplying a volatile carbonaceous matter to the mold walls in order to prevent adhesion of the material being cast. For this purpose I provide one or more containers 12 arranged to contain a substance such as oil which will be converted into a volatile carbonaceous matter when heated. As shown, there are a number of the containers 12 in the form of cups supported by rods 13 removably located within appropriate chambers 14 formed in the mold walls and provided with closures 15 for closing the upper ends of the chambers to prevent escape of the carbonaceous matter therefrom and to insure the passage of the carbonaceous matter to the walls of the mold cavity through appropriately formed passages 16. While I have shown a number of the containers 12 it is obvious that the number may be varied as desired, and that only one of said containers, or more, may be used.

The rods carrying the containers 12 may be easily removed and the containers dipped into oil of the proper quality, and then placed in the chambers 14. When the mold is heated the oil is converted into a volatile carbonaceous matter which passes through the passages 16 to the inner surfaces of the mold walls upon or to which the carbonaceous matter settles or adheres, forming a layer and preventing the adhesion of the material in the mold. When the casting operation is completed the mold sections may be taken apart and the article removed, and the same operation repeated as often as desired.

A mold of this construction is highly useful and convenient in operation. The carbonaceous matter is continuously applied to the mold walls as an incident to and result of the mold walls being heated by the casting operation. The heat converts the oil into a volatile carbonaceous matter which is conducted from the mold walls continuously between the casting operations.

It will be observed that the oil is not permitted to flow or pass into the mold cavities, but that a continuous supply of superior and more efficient carbonaceous matter is deposited on the mold walls as an incident to use of the mold in making castings.

As shown, the containers 12 are adjustable upon the rods 13 but it is obvious that the containers may be otherwise connected to the rods. Also the construction of the mold may be varied in numerous other particulars without departure from the invention. I do not restrict myself to the identical features of construction illustrated, but what I claim and desire to secure by Letters Patent, is:—

1. A casting mold, comprising a mold body having a cavity adapted to form a casting, containers adapted to contain a lubricant that will be converted to volatile carbonaceous matter by the heat of the mold, and passages for conducting the volatile carbonaceous matter to the wall of the mold cavity.

2. A casting mold, comprising a mold body having a cavity adapted to form a casting, passages for conducting volatile carbonaceous matter to the wall of the mold, and receptacles adapted to contain lubricant that will be converted to volatile carbonaceous matter by the heat of the mold.

3. A casting mold, comprising a mold body having a cavity adapted to form a casting, chambers in the mold body, oil containers in said chambers, and passages from said chambers opening into the mold cavity.

4. A casting mold, comprising a mold body having a cavity adapted to form a casting, chambers formed in the mold body, oil containers removably supported in said chambers, and passages from said chambers opening into the mold cavity for the purpose described.

5. A casting mold, comprising a mold body having a cavity adapted to form a casting, chambers formed in the mold body, containers in said chambers adapted to contain a lubricant, passages from said chambers opening into the mold cavity adapted to conduct volatile carbonaceous matter from said chambers into the mold cavity, and a series of venting passages from the mold cavity adapted to insure escape of the gases from said cavity during the casting operation.

6. A casting mold, comprising a plurality of sections arranged side by side to form a mold cavity, a series of containers adapted to contain lubricant that will be converted to volatile carbonaceous matter by the heat of the mold, means for supporting said containers in position to be subjected to the heat of the mold, whereby the lubricant in said containers will be converted into volatile carbonaceous matter, and a series of passages for conducting the carbonaceous matter into the mold cavity.

7. A casting mold, comprising a mold body composed of separable sections arranged side by side to form a mold cavity, venting passages from the mold cavity adapted to insure escape of the gases from said cavity during the casting operation, a series of containers adapted to contain a lubricant, means for supporting said containers in the mold body in such position that the lubricant will be converted to volatile carbonaceous matter by the heat of the mold, and passages for conducting the volatile carbonaceous matter into the mold cavity.

8. A casting mold, comprising a mold body having a cavity adapted to form a casting, a series of containers removably supported by the mold body and adapted to contain a substance that will be converted into volatile carbonaceous matter when subjected to heat, and means for causing the volatile carbonaceous matter to pass into the mold cavity.

9. A casting mold, comprising a mold body having a cavity adapted to form a casting, a series of containers removably supported by the mold body adapted to contain a substance that will form a volatile carbonaceous matter when subjected to heat, passages for conducting the volatile carbonaceous matter into the mold cavity, and means for preventing the passage of the carbonaceous matter elsewhere than into the mold cavity.

10. A casting mold, comprising a mold body having a cavity adapted to form a casting, a chamber in said mold body adapted to contain a substance that will be converted into a volatile carbonaceous matter when subjected to heat, passages for conducting the carbonaceous matter from said chamber to the mold cavity, and means for preventing the passage of said substance from said chamber into the mold cavity.

11. A casting mold, comprising a mold body having a cavity adapted to form a casting, chambers in said body adapted to contain a material for forming a carbonaceous matter, passages for conducting the carbonaceous matter from said chambers into the mold cavity, and means for preventing the material from which the carbonaceous matter is formed from passing from said chambers into the mold cavity.

12. A casting mold, comprising a mold body having a cavity adapted to form a casting, chambers in said mold body adapted to contain a material that will form volatile carbonaceous matter when subjected to heat, passages for conducting the carbonaceous matter from said chambers into the mold cavity, and containers in said chambers adapted to contain substance for forming the volatile carbonaceous matter.

13. A casting mold, comprising a mold body having a cavity adapted to form a casting, chambers in said mold body adapted to contain a material that will form volatile carbonaceous matter when subjected to heat, passages for conducting the carbonaceous matter from said chambers into the mold cavity, containers in said chambers adapted to contain substance for forming the volatile carbonaceous matter, and means for preventing the volatile carbonaceous matter from escaping from said chambers.

14. A casting mold, comprising a mold body composed of separable sections juxtaposed to form a mold cavity adapted to form a casting, chambers in said mold body adapted to contain a substance that will form volatile carbonaceous matter when subjected to heat, means for opening and closing said chambers, and passages from said chambers to the mold cavity.

15. A casting mold, comprising a mold body having a cavity adapted to form a casting, chambers in said mold body, means for opening and closing said chambers, containers in said chambers adapted to contain a substance that will be converted to volatile carbonaceous matter when subjected to the heat of the mold, and passages from said chambers for conducting the volatile carbonaceous matter into the mold cavity.

16. A casting mold, comprising a mold body having a cavity adapted to form a casting, chambers in said mold body, containers supported in said chambers, means for opening and closing said chambers, passages from said chambers opening into the mold cavity, and a series of venting passages from said cavity adapted to insure the escape of the gases from said cavity during the casting operation.

17. A casting mold, comprising a mold body having a cavity adapted to form a casting, a passage for conducting the material to be cast into the mold cavity, passages from the mold cavity adapted to insure escape of the gases from said cavity during the casting operation, chambers in said mold body, containers removably supported in said chambers adapted to contain a substance that will be converted to volatile carbonaceous matter when subjected to heat, and passages from said chambers into the mold cavity.

18. A casting mold, comprising a mold body having a cavity adapted to form a casting, a passage for conducting the material to be cast into the mold cavity, passages from the mold cavity adapted to insure escape of the gases from said cavity during the casting operation, chambers in said mold body, containers removably supported in said chamber adapted to contain a substance that will be converted to volatile carbonaceous matter when subjected to heat, passages from said chambers into the mold cavity and devices for closing said chambers to insure the passage of the volatile carbonaceous matter through said passages into the mold cavity.

19. A casting mold, comprising a mold body having a cavity adapted to form a casting, a container adapted to contain a substance that will be converted to volatile carbonaceous matter by the heat of the mold, and a passage for conducting the volatile carbonaceous matter to the wall of the mold cavity.

20. A casting mold, comprising a mold body having a cavity adapted to form a casting, a container supported by said body adapted to contain a substance that will be converted to volatile carbonaceous matter by the heat of the mold, and a series of upwardly inclined passages for conducting the carbonaceous matter into the mold cavity.

21. A casting mold, comprising a mold body having a cavity adapted to form a casting, passages for conducting volatile carbonaceous matter into the mold cavity, and a container for supporting a substance that will be converted to volatile carbonaceous matter by the heat of the mold, said container being arranged to prevent flow of said substance through said passages and to permit the volatile carbonaceous matter to pass through said passages into the mold cavity.

22. A casting mold, comprising a body having a cavity adapted to form a casting, a container adapted to contain a substance for forming volatile carbonaceous matter, a passage for conducting the volatile carbonaceous matter from said container into the mold cavity to prevent adhesion of the material cast in the mold cavity, and venting passages from the mold cavity adapted to insure escape of the gases from the mold cavity during the casting operation.

23. A casting mold, comprising a body having a cavity adapted to form a casting, a container adapted to contain a substance for preventing adhesion to the mold body of the material being cast, and a passage for conducting the substance from said container to the wall of the mold cavity.

FREDERICK HACHMANN.